May 2, 1939.    J. S. LOEWUS    2,156,301
CUSHION SUPPORT
Filed Dec. 5, 1936

JULIAN S. LOEWUS
INVENTOR

BY Robert A. Lavender
ATTORNEY

Patented May 2, 1939

2,156,301

UNITED STATES PATENT OFFICE 2,156,301

CUSHION SUPPORT

Julian S. Loewus, Baltimore, Md.

Application December 5, 1936, Serial No. 114,343

6 Claims. (Cl. 248—358)

(Granted under the act of March 3, 1883, as amended April 30, 1928; 370 O. G. 757)

This invention relates to a cushion support and has for an object to provide a combination noise and vibration dampener or cushion support of light, medium load capacity, wherein the resilient member employed functions under tension, compression, shear, or any combination thereof, depending upon the way the cushion is loaded. This cushion support is composed of a minimum number of parts, including two preferably identical securing elements, such as bolts, the headed ends of which are embedded within the resilient member and are provided with cotton or wire fabric screen or other means preventing the securing means from pulling away from the resilient means. This fabric or other means is not only intended to prevent the securing means from pulling out of the resilient means but also limits the stretch of the resilient means to within its elastic limit. The compact, small, easily handled unit, provided by this cushion support is of simple design and manufacture, and has wide adaptability in its use, cannot fracture or collapse, and has a high efficiency.

With the foregoing and other objects in view, the invention consists in the construction, combination and arrangement of parts, as will be hereinafter more fully described.

Figs. 5 to 11, inclusive, show sectional views of different forms of the cushion support.

Figure 12:
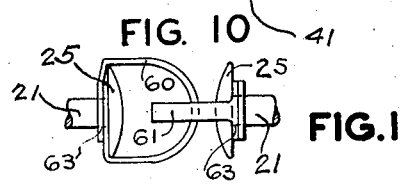

Fig. 12 shows interlocking means to prevent the separation of the securing bolts, if the resilient member is burnt out, due to fire.

Figure 5:
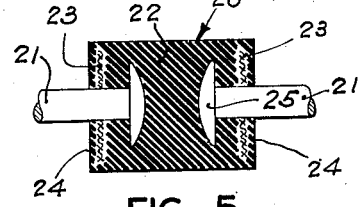

As shown in Fig. 5, the cushion support for vibration dampener 20 comprises two bolt members 21 having rather large heads 25 anchored within a body of rubber 22. Each bolt 21 extends through a fabric washer 23 embedded within the rubber body 22 and separated from the end thereby by a rubber wall 24. A compressive load will be carried by the whole rubber body 22, while a tensile load will be supported by the rubber between the bolt heads and the bond between them. The purpose of the fabric 23 or other suitable flexible reinforcement which can be impregnated with the rubber or other resilient substance, as well as cast in the body, is, in this case, to assist in preventing the heads of the bolts from breaking through the ends of the rubber body. Shear will be taken by the rubber body 22, and preferably that portion which is between the heads of the bolts 21. Obviously, the fabric 23 may be of cotton or similar material, and likewise may be of metallic netting or the like.

Figure 6:
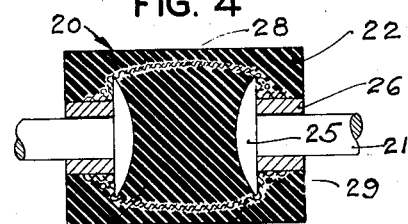

Instead of placing the bolt 21 through an aperture in the fabric 23 it may be placed through a sleeve 26 within the body 22, as shown in Fig. 6, while the fabric 23 is in the form of a canvas stocking with its open ends gathered over the bolt head 23 enclosing a rubber portion 27 therein. A wire 29 may be tightly fastened about the end of the stocking or tubular shaped fabric 23 to hold the ends thereof in position under the bolt heads 25.

Figure 1:
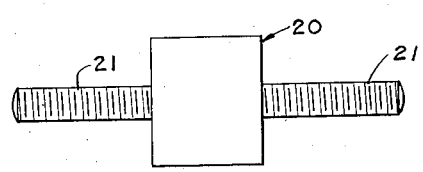
Fig. 1 is an elevational view of the cushion support.
Figures 2, 3:
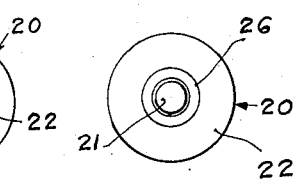
Fig. 2 is an end view of the cushion support of Fig. 1, as well as of Figs. 5, 8 and 9.
Fig. 3 is an end view of another form of this invention such as illustrated in Figs. 6 and 7.
Figure 4:
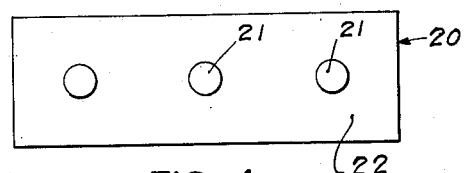
Fig. 4 is an end view of a multiple form of cushion supports.
Figure 7:
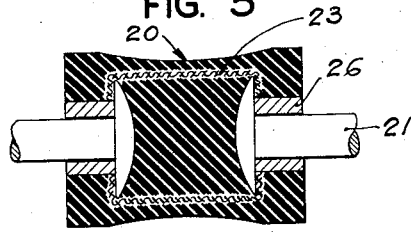

When making the cushion support up in strip form, as shown in Fig. 4, the fabric or stocking 23 may have its axis extending in the direction of the length of the strip and have the bolts 21 extend through opposite sides of the fabric 23, as shown in Fig. 7, sleeves 26 being provided, if desired.

Figure 8:
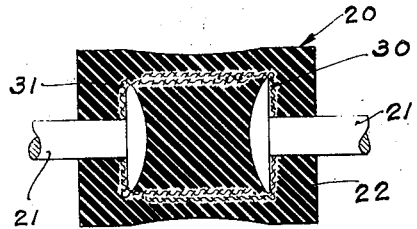

As in Fig. 8, the reinforcing fabric may be in the form of two separate fabric sheets or cups 30 and 31, through which the bolts 21 are inserted, and having their ends in overlapping relation, as shown.

Figure 9:
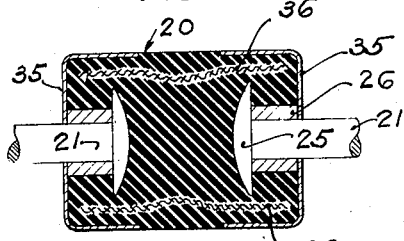

In Fig. 9, two metallic cups or channels 35 may be provided over the ends of the rubber body with the bolts 21 extending therethrough and the sleeves 26 abutting the heads 25 of the cups or channels 35, the fabric tube 36 in this case being shown as being embedded about, but not beneath, the bolt heads 25.

Figure 10:
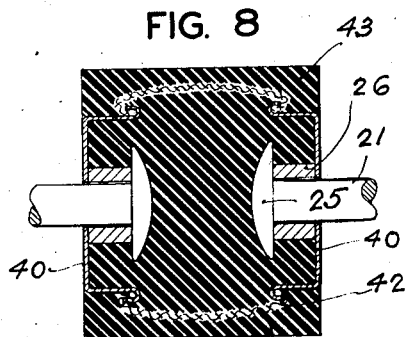

In Fig. 10 the channels or cups 40 extend into the ends of the body and have reversed edges 42 in which are secured the ends of the canvas stocking or strip 41, an outside wall of rubber 43 preferably, but not necessarily, surrounding the canvas stocking or strip 41.

Figure 11:
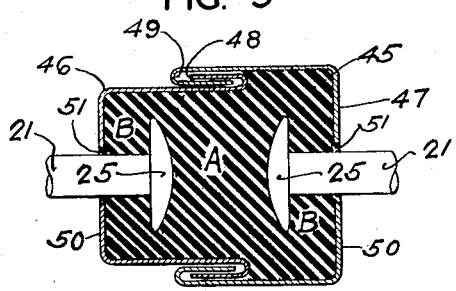

In Fig. 11 a cushion support which may be used either for compression or tension loads is shown. It is composed of two bolts 21, a body of rubber 45, and two cups or channels 46 and 47, slidably interlocked so as to prevent limited outward movement. In the case of compression loads, the portion A is under compression as well as portion B, for the rubber acts as a supporting body and the cups or channels 46 and 47 do not interfere with or hamper this type of movement. On the other hand, the portion A of the rubber body 45 is prevented from being over-stretched by the cups or channels when tension is applied to the cushion support. This limiting movement is accomplished by the end portion 49 of the channel 46 bringing up in the end of the groove 49 in channel 47. Furthermore, portion A may be under tension where its movement is held within the elastic limit of the rubber, while portion B is under compression between the bolt heads and the walls 50. The openings 51 do not bind the bolts 21, but yet, are sufficiently small to prevent the heads 25 from pulling out. Thus, even if the rubber should burn out the cushion cannot give way to release the load.

In Fig. 12 is shown a means of preventing the cushion support from parting or dropping the load, should the resilient means be burnt out. This type may be employed in any of the forms shown in the foregoing figures, as well as in any other type well known to one skilled in the art. It is composed of bolts 21 with heads or shoulders 25 embedded in the resilient means, and U-shaped metal loops 60, 61 bent from a flat plate with holes 63 punched at the ends, the holes of sufficient size to permit the bolt shank to pass through these openings 63. The loops 60, 61 interlock, yet do not touch, therefore, they in no way obstruct the free action of the cushion support under load. However, in case of fire burning out the resilient means, these interlocking loops prevent an accident by holding the load.

In Figs. 7 and 8, the cushion support is shown under tension with the sides of the body pulled inwardly, while the reinforcing fabric has been stretched to the limit at which its reinforcing action commences to operate.

In the remaining figures, the rubber bodies are shown as being free of any load.

In operation, this cushion support is intended for use in supporting a light or medium load, such as, a fan, or any vibrating object. Projecting bolts, on which ends nuts are to be fitted, make the cushion support easily securable to both load and supporting foundation. In order to permit the bolts to have the nuts made extremely tight thereon, sleeves may be provided, as shown. The flexible reinforcing serves the dual purpose of preventing overstressing of the rubber under tension or shear loads, and of preventing the bolt heads from pulling out.

In the type shown in Fig. 11, the tension load is transformed into a compression load for the most part of the rubber, this being accomplished by the heads of the bolts transmitting the load through portions B and through the cups or channels. Thus, regardless of the type of load the rubber functions primarily in compression, which provides its best efficiency.

Other modifications and changes in the proportions and arrangements of the parts may be made by those skilled in the art without departing from the nature and scope of the invention, as defined in the appended claims.

The invention described herein may be manufactured and used by or for the Government of the United States of America for governmental purposes without the payment of any royalties thereon or therefor.

Having thus set forth and disclosed the nature of this invention, what is claimed is:

1. A vibration dampener and support comprising a rubber body, attaching members including heads embedded within said rubber body and arranged in opposed relation, each of said heads being spaced inwardly from the end surfaces of said rubber body, and flexible tubular inextensible holding means embedded within said rubber body, the ends thereof surrounding said attaching members and in engagement with said heads for preventing the same from being pulled out of said rubber body, said holding means being normally unstressed in the normal use of said vibration dampener but adapted to be placed in tension upon abnormal stretch of said rubber and acting as a stop to prevent said rubber from stretching beyond its elastic limit, said holding means allowing said rubber body to be stressed in compression, tension and shear.

2. A vibration dampener and support comprising a rubber body, attaching members including heads embedded within said rubber body and arranged in opposed spaced relation, each of said heads being spaced inwardly from the end surfaces of said rubber body, abutment means within said rubber body and seated at their inner ends on said heads, the outer ends of said abutment means lying flush with the end surfaces of said rubber body, and flexible tubular non-metallic holding means embedded within said rubber body and including means connecting the ends thereof to said attaching members and in engagement with said heads for preventing the same from being pulled out of said rubber, said holding means being normally unstressed in the normal use of said vibration dampener but adapted to be placed in tension upon abnormal stretch of said rubber and acting as a stop to prevent said rubber from stretching beyond its elastic limit, said holding means allowing said rubber body to be stressed in compression, tension or shear.

3. In the vibration dampener as specified in claim 2, said flexible tubular holding means being of a barrel shape, and each end thereof being open and so formed as to surround a head of said attaching means, and means securely attaching each open end of said sleeve to its associated head outwardly thereof and inwardly of the end surfaces of said rubber block.

4. A vibration dampener and support comprising an elongated rubber body including parallel end faces, headed aligned shank members projecting from each end of said rubber body with the heads thereof embedded therein and spaced inwardly from said end faces, an abutment sleeve embedded in each end of said rubber body and surrounding each shank member, the inner ends thereof engaging said heads and the outer ends thereof lying flush with the end faces of said rubber body, an inextensible fabric sleeve embedded within said rubber body and coaxial with said shank members, each end portion of said fabric sleeve surrounding an adjacent head, and means securely fastening said fabric sleeve end portion to said heads and associated abutment sleeves whereby to limit separating movement of said headed shank members, said inextensible fabric sleeve allowing said rubber body to be stressed in compression, tension or shear.

5. A vibration dampener and support comprising an elongated rubber body including parallel end faces, headed aligned shank members projecting from each end of said rubber body with the heads thereof embedded therein and spaced inwardly from said end faces, an abutment sleeve embedded in each end of said rubber body and surrounding each shank member, the inner ends thereof engaging said heads and the outer ends thereof lying flush with the end faces of said rubber body, an inextensible fabric sleeve embedded within said rubber body and coaxial with said shank members, each end portion of said fabric sleeve surrounding an adjacent head, a metallic cup-shaped element embedded within each end of the rubber body and each seated on the outer face of an abutment sleeve with the peripheral ends of said cup-shaped elements opposing each other and formed with reversely bent flanges, said end portions of said fabric sleeve being attached to said reversely bent flanges, the construction being such as to allow said rubber body to be stressed in compression, tension or shear.

6. A vibration dampener and support comprising a rubber body, attaching members including heads embedded within said rubber body and arranged in opposed relation, each of said heads being spaced inwardly from the end surfaces of said rubber body, holding means embedded within said rubber body and associated with said heads for preventing the same from being pulled out of said rubber body, said holding means allowing said rubber body to be stressed in compression, tension and shear, and a flat metallic strip having perforated ends arranged in overlapping registering relation to define a closed metal loop slipped over each attaching means and seated on the head thereof, said closed loops being arranged in overlapping interlocked relation and normally out of engagement, said closed loops permitting free interaction while preventing the dropping of the load when the resilient means has been burnt out.

JULIAN S. LOEWUS.